March 18, 1958 C. E. SANBORN ET AL 2,827,334
CURVED DUCTS FOR TRANSPORTING SUSPENSIONS OF SOLIDS
Filed April 7, 1955 2 Sheets-Sheet 1

INVENTORS
CHARLES E. SANBORN
RAYMOND A. MUGELE
BY
THEIR ATTORNEY

INVENTORS
CHARLES E. SANBORN
RAYMOND A. MUGELE
BY
THEIR ATTORNEY

United States Patent Office 2,827,334
Patented Mar. 18, 1958

2,827,334

CURVED DUCTS FOR TRANSPORTING SUSPENSIONS OF SOLIDS

Charles E. Sanborn, Walnut Creek, and Raymond A. Mugele, Oakland, Calif., assignors to Shell Development Company, New York, N. Y., a corporation of Delaware Application April 7, 1955, Serial No. 499,831

2 Claims. (Cl. 302—64)

The invention relates to the transport of suspensions of solids, such as catalyst particles sand, dust or ash, in a gas ("gas" being used herein to include vapors) such as air, combustion products, steam, hydrocarbon vapors, etc., through curved ducts of varying curvature. The invention finds particular, although not exclusive, application in cases where the suspension is admitted from a feed duct into a cyclone to disengage the solids from the gas and in cases where the suspension is transferred between units of a catalytic plant in which chemical reactions or petroleum refining operations are performed.

Erosion of walls in cyclones to which gaseous suspensions of solids are supplied tangentially from either straight or curved inlet ducts, and erosion of bends in transport ducts such as risers for fluidized catalyst or sand have been serious problems. Such devices are now constructed in sections of different but constant curvatures ("curvature" being herein used to denote the reciprocal of the radius of curvature) to provide a flow path of varying curvature; thus, a section shaped as a circular arc is joined tangentially to another section which may be straight or shaped as another arc having a different curvature. Although the end of the arc is tangent to the adjoining section there is a sharp difference in curvature between the conjoined sections. In other words, there is a discontinuity in the curvature at each juncture in that the longitudinal axis or wall of the duct has one radius of curvature in one section which passes suddenly, by a step, to a different radius of curvature in the adjoining section. Such discontinuity prevails also at the entrance to a conventional vortex device, such as a cyclone, which has a confining wall shaped internally as a surface of revolution and provided with a tangential inlet duct which has a curvature less than that of the cyclone wall; the inlet duct in this case is the upstream duct section and the cyclone wall is the downstream section.

Such discontinuity in curvature results in the impingement of numerous solids of the flowing suspension against a localized region of the wall of the downstream section. This localized impingement, in turn, causes severe erosion of the wall and necessitates the provision of special wear plates (which destroy the streamlined contour of the wall) and/or frequent shut downs for replacement of the eroded wall.

It is the object of this invention to overcome such erosion incident to the passage of gaseous suspensions of solids through a duct of varying curvature, the term duct being understood to be generic to confined flow channels made up of sections of like or of different cross sectional areas, viz., to include the combination of an inlet duct and a vortex chamber.

Now according to the invention such erosion in ducts of varying curvature is avoided or reduced by making the curvature of the duct continuous along the length thereof, i. e., by avoiding discontinuity in the curvature. The curvature may but need not vary monotonically with respect to length. As applied specifically to cyclones and similar vortex devices, this requirement is met by joining the feed duct not only tangentially to the cyclone wall but, further, making the curvature of the feed duct equal to that of the cyclone wall at the juncture or tangent point and shaping the duct so that the curvature changes, e. g., decreases, without discontinuity along the length thereof. The invention is also applicable to connecting two duct sections of uniform curvatures (either or both of which may be straight or circularly arcuate); as applied, for example, to connecting a straight duct section to a second duct section the end of which is displaced from the axis of the straight section, there is provided a transition duct section one end of which is tangent to the straight section and has zero curvature, the curvature changing along the length of the transition section without discontinuity; the other end is similarly joined to the second section, being both tangent thereto and to like curvature.

The invention will be described further in connection with the accompanying drawing forming a part of this specification and showing, by way of example, a single installation including a riser duct and a cyclone in each of which the invention is applied. In the drawing.

Figure 2:
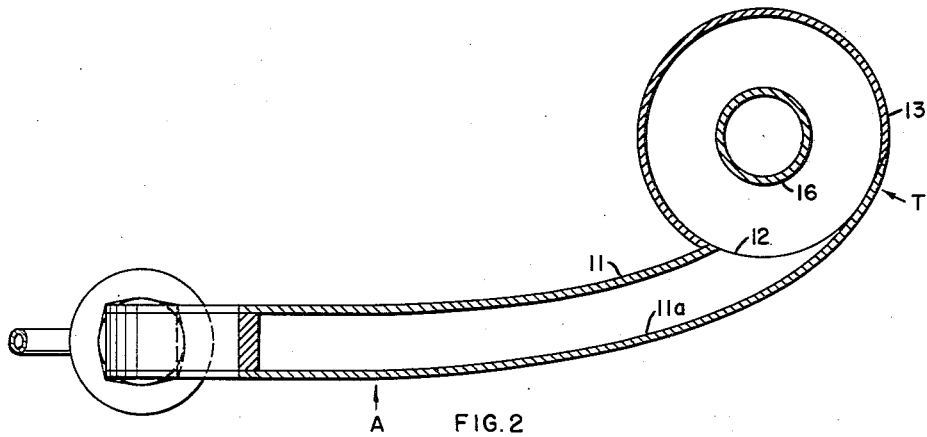
Figure 2 is a sectional view taken on the line 2—2 of Figure 1.

Referring to the drawings in detail, there are shown a lift pot 5 which receives catalyst particles by gravity flow from a standpipe 6 and entraining gas, such as air or stream from a gas pipe 7 for forming a suspension which ascends through the riser pipe made up of lower and upper sections 8 and 9. Details of lift pots are known in the art and are not germane to the invention; further description thereof is, therefore, not included herein. The upper riser section 9 has a riser bend 10 making a 90° turn and ending as a horizontal section 11. The last is connected at the inlet opening 12 of the wall 13 of a separating cyclone, the said wall being shaped as a surface of revolution and defining a vortex chamber. The cyclone, which may be of any type, includes a top closure wall 14, a bottom closure 15, and inner gas exit cylinder 16 that extends from a level beneath the inlet opening upwards through the wall 14 for discharging gas freed from solids. The solid catalyst is flung by centrifugal force against the wall 13 and is discharged through a leg 17.

The top section 9, bend 10 and horizontal section 11 of the duct are advantageously made rectangular in cross section for ease in fabrication to the shape described below; these parts may, however, have any other cross sectional shapes, insofar as the purposes and advantages of the invention are concerned. It should be noted, however, that the separation in the cyclone is usually promoted by making at least the part of the section 11 near the wall rectangular in shape. The lower section 8 is shown to be circular in cross section; again, the shape is not material.

Considering first the application of the invention to the cyclone inlet, it will be noted that the section 11 constitutes the inlet duct to the cyclone and that, when viewed in plan as seen in Figure 2, the part to the left of the point A is straight, i. e., has zero curvature and the right end of the duct or, more specifically, the radially outer duct wall 11a, is tangent to the cyclone wall 13 at the tangency point T and has a curvature equal to that of the wall 13. Now according to the invention the parts of the duct between the points A and T are shaped so that the curvature is continuous; stated in other words, the curvature changes without any step or discontinuity from the zero curvature of the straight section to the left of point A to the curvature of the wall 13 at the point T. In the preferred case illustrated this increase in curvature is monotonic in that it increases progressively; this is not, however, a necessary condition.

Figure 3:
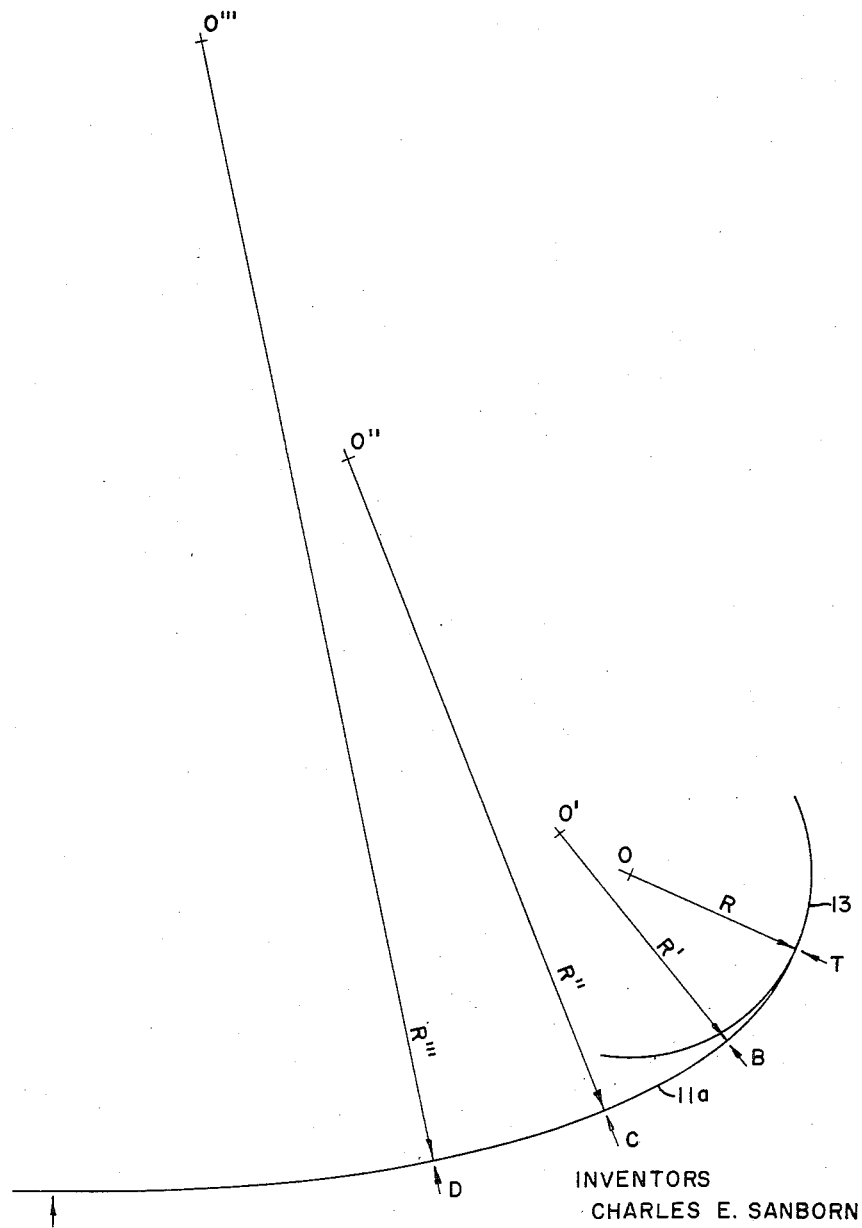
Figure 3 is a diagram illustrating the geometrical relations involved in the cyclone and inlet duct.

The shape described in the preceding paragraph may be further understood by reference to Figure 3, wherein 11a and 13 are the traces on a horizontal plane of Figure 2, of the inner surfaces of the duct wall and cyclone wall, respectively, the scale being enlarged in relation to Figure 2. O is the center of curvature of the wall 13, which has a radius R. At the tangency point T and wall 11a also has O as its center of curvature. Moving leftward from the point T the radius of curvature of the duct wall increases progressively and without discontinuity being, for example, R', R" and R'" at points B, C and D, with centers of curvature at O', O" and O'", respectively. At point A the radius of curvature is infinite.

Figure 1:
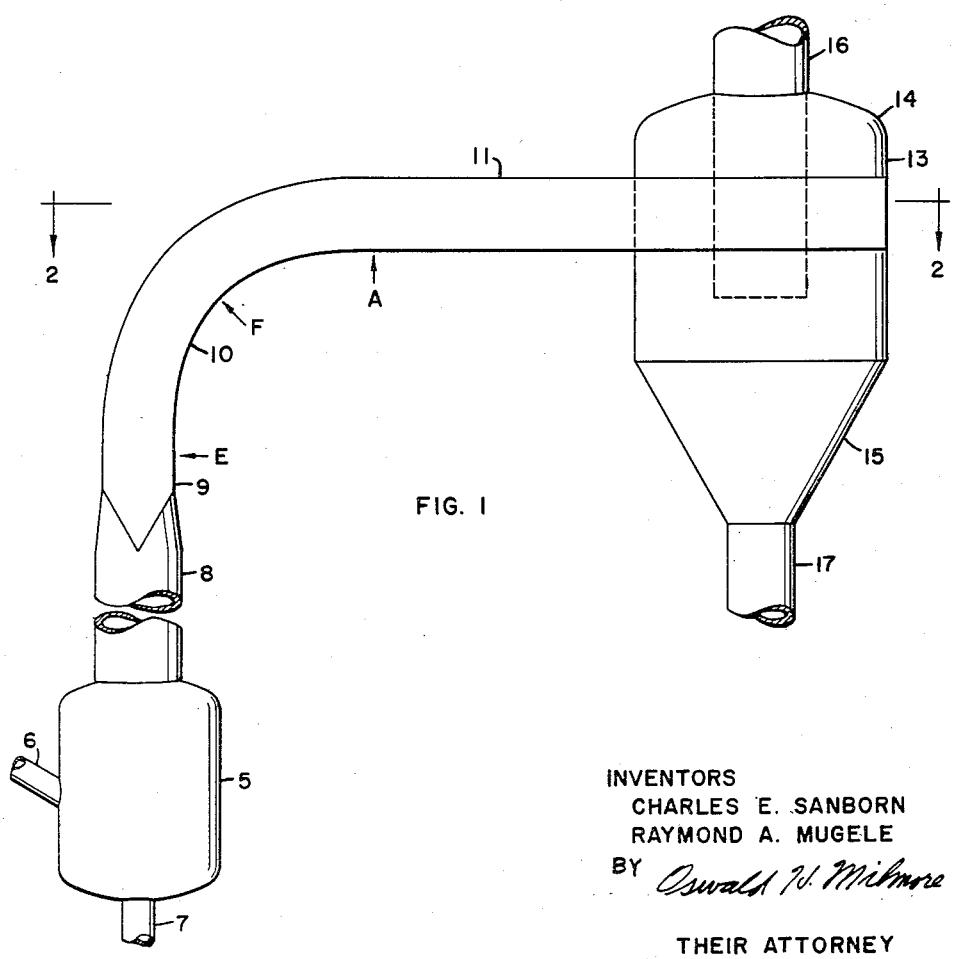
Figure 1 is an elevation view of a catalyst riser and cyclone.

Considering next the application of the invention to the riser bend, it will be noted that the section 10, as viewed in elevation, Figure 1, is straight, i. e., has zero curvature, both at points E and A where it joins the vertical section 9 and the horizontal section 11, respectively. The curvature increases without discontinuity from point E and becomes maximum at the point F; beyond there the curvature decreases continuously to point A. In this case the curvature varies non-monotonically.

It may be noted that the requirement that the curvature vary continuously places no restriction on the rate of change of curvature with respect to the length of the duct; this rate of change may be constant, increasing or decreasing and need not be continuous.

We claim as our invention:

1. A vortex device including a vortex wall shaped as a surface of revolution and enclosing a vortex chamber, said wall having an inlet opening; outlet means for said vortex chamber; and an inlet duct connected to said vortex wall at said opening, said duct having one wall thereof joined tangentially to said vortex wall and said one duct wall having a curvature which varies continuously and is equal to the curvature of the vortex wall at the junction therewith.

2. A vortex device according to claim 1 wherein the end of said inlet duct remote from the vortex wall has zero curvature.

References Cited in the file of this patent

UNITED STATES PATENTS

| | | |
|---|---|---|
| 2,676,142 | Crowley | Apr. 20, 1954 |
| 2,758,885 | Rehbein | Aug. 14, 1956 |

FOREIGN PATENTS

| | | |
|---|---|---|
| 175,537 | Austria | July 25, 1953 |